United States Patent [19]

Dalrymple

[11] Patent Number: 5,027,310
[45] Date of Patent: Jun. 25, 1991

[54] CARRY CHAIN INCREMENTER AND/OR DECREMENTER CIRCUIT

[75] Inventor: Monte J. Dalrymple, Fremont, Calif.

[73] Assignee: Zilog, Inc., Campbell, Calif.

[21] Appl. No.: 404,591

[22] Filed: Sep. 8, 1989

[51] Int. Cl.$^5$ .............................................. G06F 7/50
[52] U.S. Cl. .................................................. 364/770
[58] Field of Search ................. 364/770, 787; 377/123

[56] References Cited

U.S. PATENT DOCUMENTS

| 4,153,939 | 5/1979  | Kudou            | 364/770 |
| 4,417,315 | 11/1983 | Russell          | 364/770 |
| 4,486,851 | 12/1984 | Christopher et al. | 364/770 |
| 4,885,716 | 12/1989 | Little           | 364/770 |

FOREIGN PATENT DOCUMENTS

0227427A2 7/1987 European Pat. Off. .

OTHER PUBLICATIONS

Elliott, "Increment-Decrement Logic", *IBM Tech. Disclosure Bulletin*, vol. 11, No. 3, Aug. 1968, pp. 297-298.

Miranker, "High-Speed Incrementer Using Transfer Gates", *IBM Tech. Disclosure Bulletin*, vol. 25, No. 1, Jun. 1982, pp. 75-76.

"Parallel-Array Incrementing Network", *IBM Tech. Disclosure Bulletin*, vol. 27, No. 11, Apr. 1985, pp. 6450-6453.

"MOSFET Look-Ahead Bit Incrementer/Decrementer", *IBM Tech. Disclosure Bulletin*, vol. 28, No. 2, Jul. 1985, pp. 741-742.

Ngai, "Regular, Area-Time Efficient Carry-Lookahead Adders", *Journal of Parallel and Distributed Computing*, vol. 3, pp. 92-106 (1986).

*Primary Examiner*—David H. Malzahn
*Attorney, Agent, or Firm*—Majestic, Parsons, Siebert & Hsue

[57] ABSTRACT

A digital electronic circuit for incrementing or decrementing a binary word one count at a time. Such a circuit has an application as an address counter wherein a block of addresses in memory are stepped through one at a time. Such an address counter is found, for example, in a direct memory access (DMA) computer system integrated circuit. The count is incremented or decremented by adding or subtracting, respectively, a one from the current binary count in order to obtain a new count. A carry chain used as part of such addition circuit is separated into at least two parts and a look-ahead chain is added to work in conjunction with the carry chain to anticipate certain changes without having to wait for the carry chain to be fully sequenced. This technique reduces the time necessary to calculate the carries in the addition or subtraction process and further allows some parallel operation of the two parts of the carry chain. In a preferred implementation, the carry chain, look-ahead chain and an adder are formed in repeatable, interconnected cells wherein each chain stage has essentially a single gate and in which each cell includes the gates of two non-adjacent stages of each of the chains. This allows the circuit to be constructed in CMOS, minimizes the number of gates, and thus gate delays, and makes it easy to lay out a circuit.

7 Claims, 4 Drawing Sheets

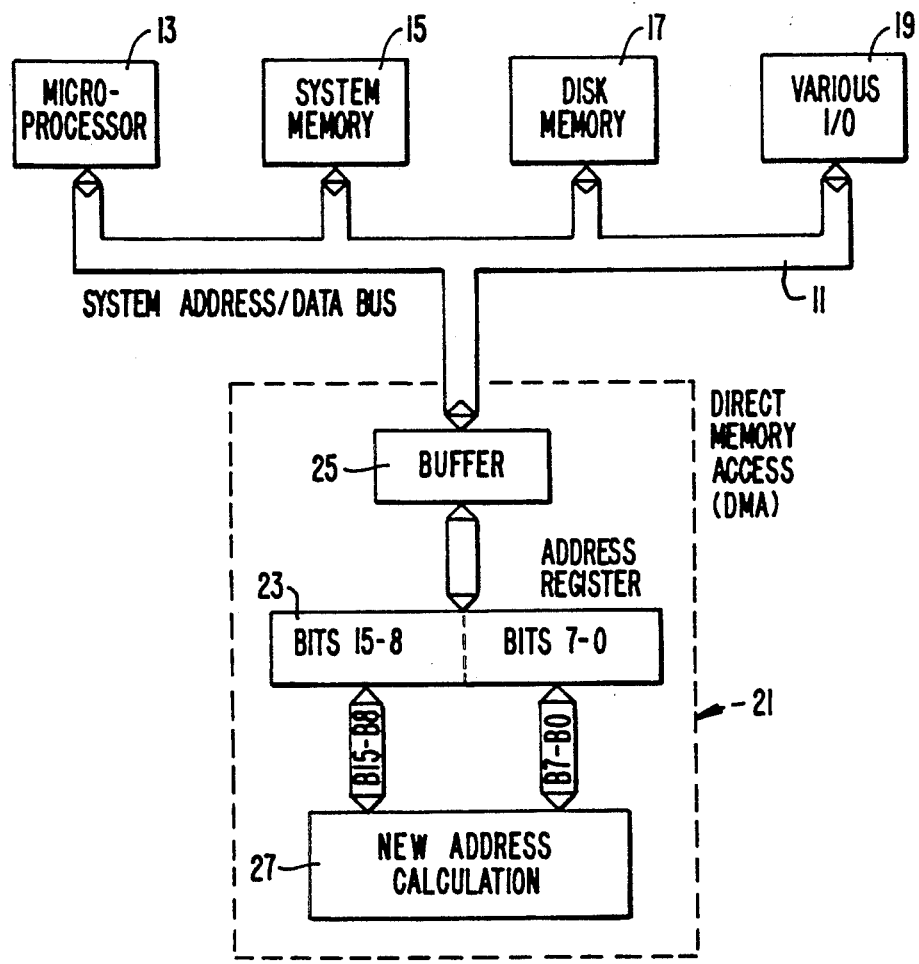
FIG._1.
FIG._2.

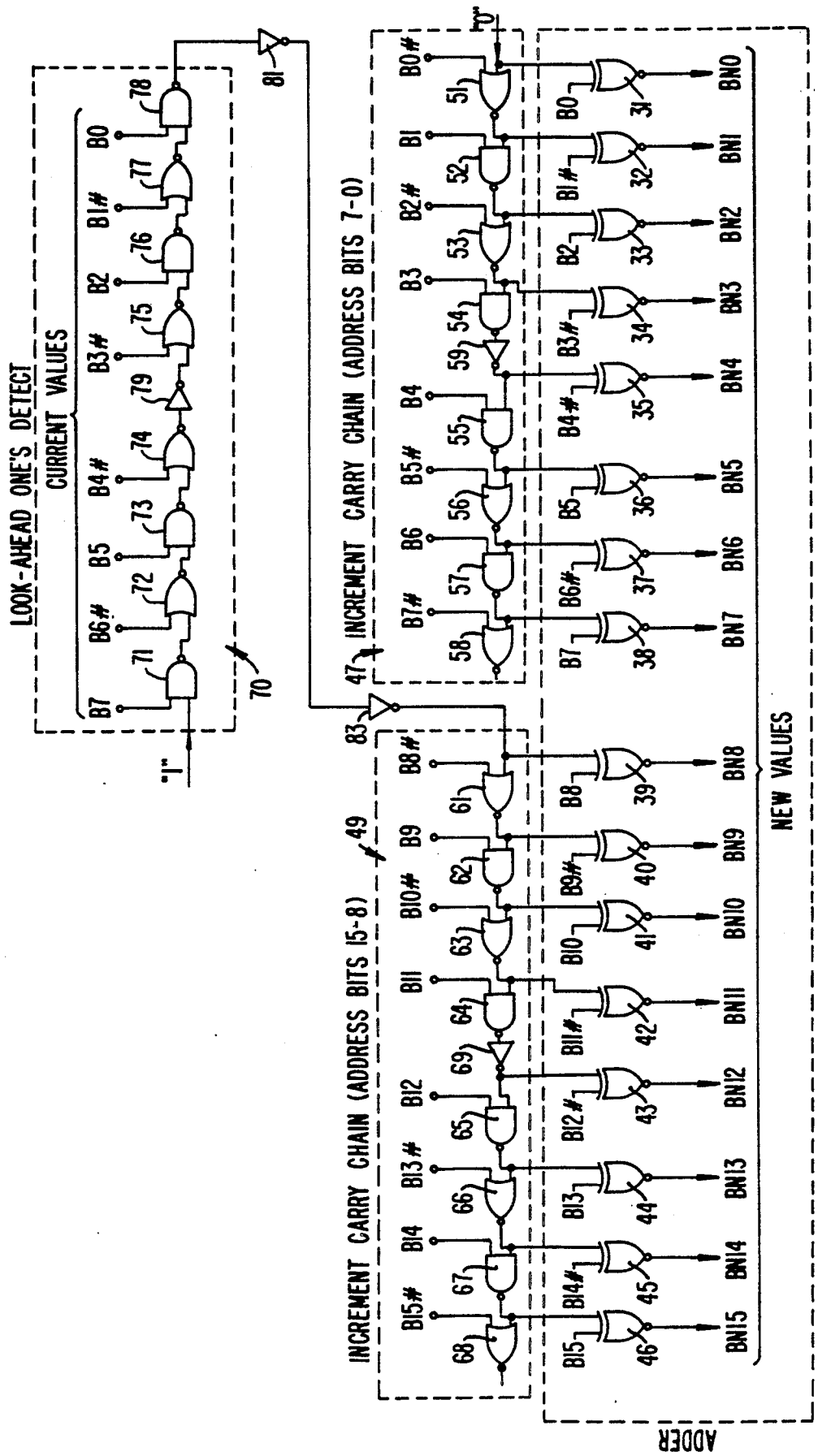
FIG._3.

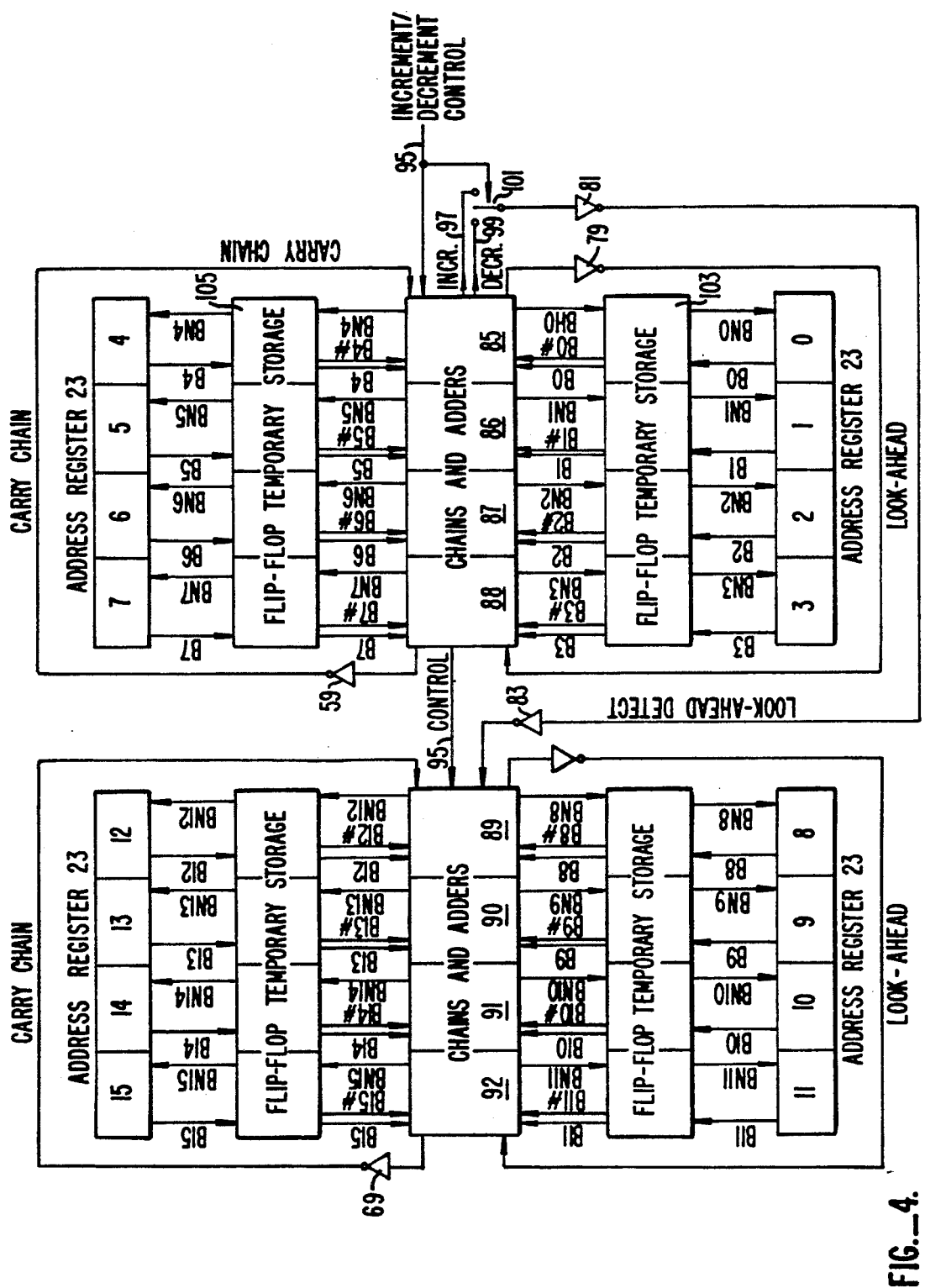
FIG._4.

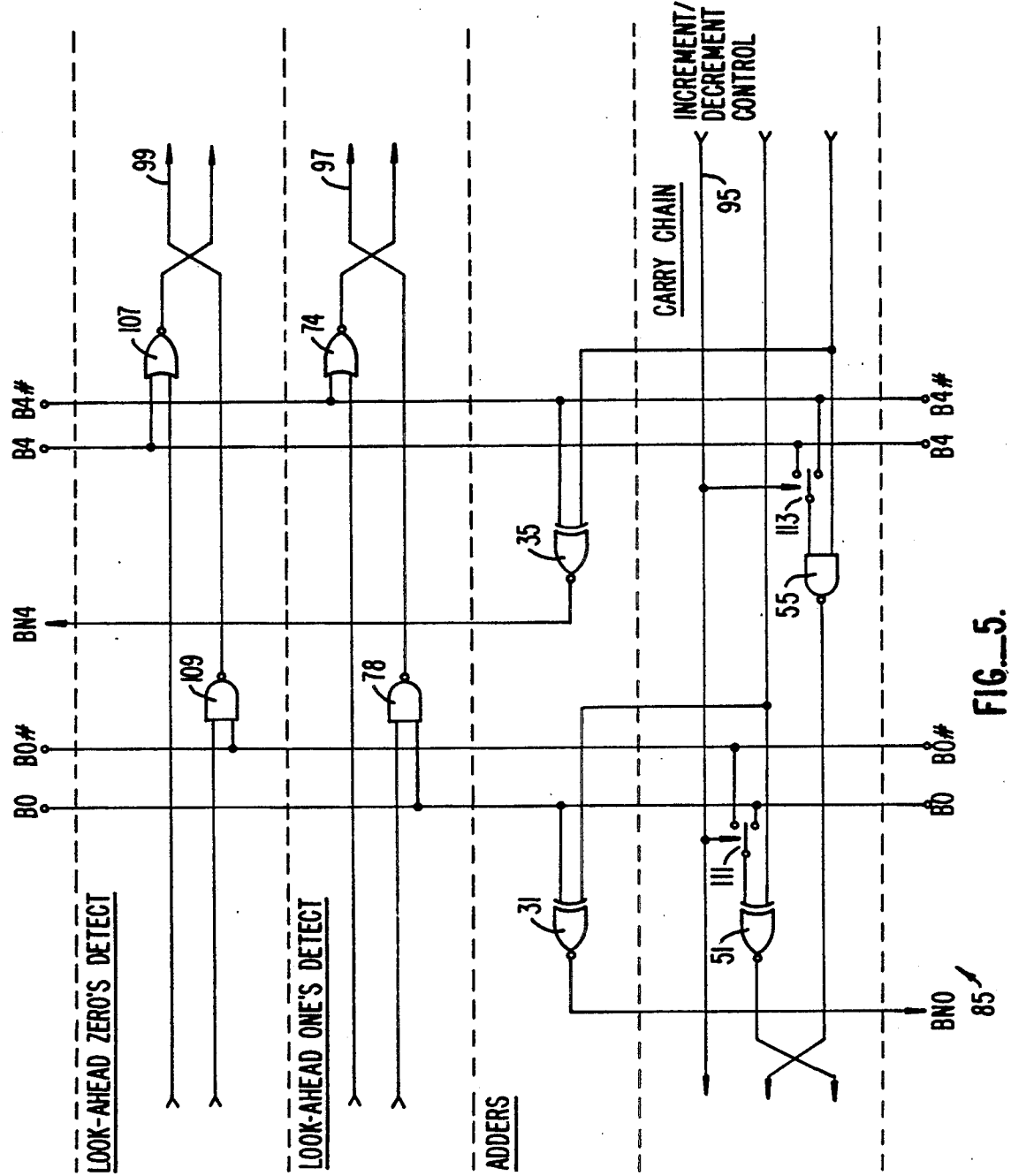
FIG._5.

CARRY CHAIN INCREMENTER AND/OR DECREMENTER CIRCUIT

BACKGROUND OF THE INVENTION

This invention relates generally to digital electronic counting techniques, and, more specifically, to an incrementer/decrementer circuit.

There are many instances in digital computer design where a counter is provided for counting up (incrementing) one binary number at a time and/or counting down (decrementing) one binary number at a time. One widespread use of such an incrementer/decrementer is for accessing a computer memory by stepping through a number of sequential memory addresses, one at a time. The memory address usually contains a number of bits equal to the width of the computer system address bus, typically 8, 16, 32, 64 or more bits, depending upon the particular application and size of the computer system.

This is done, for example, in a microcomputer direct memory access (DMA) integrated circuit chip. An incrementer/decrementer circuit in a DMA is provided with a beginning address by the computer system microprocessor and an instruction as to whether the memory is to be accessed in an address space above (increment) or below (decrement) this beginning address. The DMA incrementer/decrementer then puts the beginning address out onto the computer system address bus and increments or decrements that address by one binary count at a time. Thus, all addresses within the designated address space are accessed in sequence for reading or writing data into those memory locations.

Such an incrementer/decrementer circuit is essentially a counter that adds or subtracts a binary one to the current address in order to obtain a new address. An exclusive OR (XOR) gate is typically provided for each bit of the address word and receives as an input the current value of its associated address bit and a carry-in from the addition operation of the lesser significant bit adjacent the current bit. The carry-in bit values are typically provided by a carry chain that has a circuit stage for each bit of the address. The carry chain stages are connected in series and each typically consists of a single AND gate whose inputs are the carry-in signal from the previous stage and the current value of the address bit with which the stage is associated. A carry bit is thus advanced through the chain from its initial stage associated with the least significant address bit through the stage associated with the most significant bit of the address. Some time is of course required for each carry bit to progress through the chain and thus places some limitation on the speed of such an incrementer/decrementer. However, a carry chain is preferred over other incrementer/decrementer logic configurations which usually requires a much larger number of logic gates and thus consumes more space on an integrated circuit chip.

An important and popular technology for constructing such logic gates is with the use of complementary metal-oxide semiconductor (CMOS) integrated circuits (ICs). CMOS technology does not permit implementation of an AND logic function in a single gate so it is commonly accomplished by a series combination of a NAND gate and an inverter. Thus, a carry chain can be provided as part of an incrementer/decrementer with each stage including two such gates. The increased number of gates, of course, increases the minimum amount of time that is necessary for a carry bit to progress completely along the chain, since there is a potential delay imposed by each gate. This can be a limitation on the operating speed of the circuit, and then of the complete computer system when utilizing the circuit, especially when the address is 16, 32 or more bits wide since this requires, respectively, 32 or 64 gates in the carry chain.

Therefore, it is a primary object of the present invention to provide an incrementer/decrementer technique having a carry function that operates with increased speed, minimizes the amount of integrated circuit area necessary for its implementation, and which is easy to design and fabricate.

It is a more specific object of the present invention to provide such a technique in circuits implemented in CMOS technology.

SUMMARY OF THE INVENTION

These and additional objects are accomplished by the various aspects of the present invention, wherein, briefly, according to a principal aspect, the current value of each bit in a block of the address bits is scanned from the most significant bit to the least, a direction opposite to operation of the normal carry chain. The technique "looks ahead" to the bit values to be encountered in the carry operation in order to be able to perform certain operations as part of the addition process without having to wait for the carry function to be completed on that block of address bits.

To implement this principal aspect of the invention, a carry chain is broken into at least two segments, one segment for a block of the least significant address bits and at least one other segment for a block of more significant address bits. Rather than the carry-in signal to the more significant block being provided from the least significant block, a separate look ahead chain is utilized to provide the input carry-in signal to the more significant chain segment. The look ahead chain is of similar construction to a carry chain but increments a carry value from the most significant bit of the least significant address block of bits. The result is the ability to "look ahead" and anticipate when the address count is such that the more significant chain segment will be changing, and thus introduces a degree of parallelism to the carry operation, thereby increasing its speed.

In a preferred implementation, each of the carry chain and look ahead chain are implemented with essentially only one gate per stage, alternating NAND gates and NOR gates in series, something that can be implemented in CMOS. The use of only one gate per chain stage also aids in speeding up the operation of the circuit. The difficulty of implementing such a chain with two different types of gates is overcome by providing a repeatable integrated circuit cell that includes logic elements for addition, carry chain and look ahead chain functions associated with two non-contiguous bits of the address. The cell is repeated across the integrated circuit to provide the number of chain stages and adders that are required by the number of bits in the address with which the circuit is to be used.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1 is a diagram of a computer system, as an example, in which the various aspects of the present invention are utilized;

FIG. 2 sets forth a binary count to illustrate operation of the present invention;

FIG. 3 is a logic circuit diagram of an example incrementer that uses the principal aspect of the present invention;

FIG. 4 illustrates in block diagram form a preferred organization of an incrementer/decrementer circuit that utilizes the logic of FIG. 3; and, FIG. 5 is a logic circuit diagram of a repeatable cell of the incrementer/decrementer of FIG. 4.

DESCRIPTION OF THE PREFERRED EMBODIMENTS

Referring initially to FIG. 1, a computer system is generally described in order to illustrate an example application of an incrementer/decrementer that uses various aspects of the present invention. A system address data bus 11 communicates between a microprocessor CPU 13, system random access semiconductor memory 15, disk memory 17, and various input/output devices 19. In addition, in this example, a direct memory access (DMA) circuit 21 is also connected to the system bus 11. The purpose of the DMA 21, in this example, is to sequence through addresses of the system memory 15 in order to allow data at those addresses to be sequentially read or written. Only the portion of the DMA 21 that accomplishes the addressing function is illustrated in FIG. 1.

The DMA 21 includes an address register 23 which is connected to the system bus 11 through a usual buffering circuit 25. A circuit 27 receives the current value of the address bits stored in the address register 23, calculates new values for the address bits, and then writes the new values back into the register 23. For this example, the width of the system address carried on the bus 11, also the size of the address register 23, is 16 bits. Although the implementing circuitry to be described is for a 16 bit wide address, the techniques of this invention are not limited to any particular address width and may alternately be used with addresses of 8, 32, 64 or some other number of bits. System address bus widths of 32 bits are very prevalent in existing new microcomputer system designs.

FIG. 2 shows a few contiguous address values beginning at hexadecimal F5 and extending through 104. If the data at those addresses in the system memory 15 was to be accessed, the DMA 21 would step through those counts one at a time and present the addresses on the system bus 11 in sequence. If it is desired to increment through those addresses, the address register 23 is first programmed by the microprocessor 13 to contain the 16 bits indicated for the number F5. The DMA 21 would also be told that the counting is to stop at 104. Each 16 bit pattern shown in FIG. 2 is then applied, one at a time, in sequence, to the system bus 11, until the pattern of count 104 is reached, at which time the process stops.

Alternately, if it is desired to scan through those addresses in the memory 15 from the highest number to the lowest, then the beginning count 104 is initially written into the address register 23 by the microprocessor 13 and the DMA 21 then decrements the count from 104 down to an end point F5. Of course, practical applications of this technique usually involve stepping through a much larger address count, but a limited number of sequential addresses are being illustrated in FIG. 2 for purposes of explanation of the system's operation.

In order to explain the general techniques of the present invention, as well as the specific implementation thereof, FIG. 3 illustrates a portion of the circuit 27 of FIG. 1 that increments through successive addresses by providing a counter that adds a binary one each time it is incremented from one address to another address. An example of a 16 bit wide address is used, having a least significant bit "0" and a most significant bit "15". The notation utilized herein is that "B0", "B1", and so forth, designate the current value of the address bits 0, 1 and so forth, while the designation "B0#", "B1#", and so forth, represent the inverse of the current values of the address bits 0, 1 and so forth. Lastly, the designation "BN0", "BN1", and so forth, represent the new (next) values of those bits that is being calculated by the circuit of FIG. 3.

In order to add a binary one to the current address value, an addition circuit 29 includes 16 XOR gates 31–46, one for each bit of the address. The output of each of the gates 31–46 is a new value of one of the address bits. There are two inputs to each of the XOR gates 31–46. The first is the current value, or an inverse thereof, of the address bit of that gate. For example, the XOR gate 33 includes a current address value for bit 2, namely "B2", gate 34 an inverse of the current value for bit 3, "B3#", and so forth. The other input of each of the gates 31–46 receives a carry bit, if any, from an adjacent, lesser significant bit addition operation.

The carry bits are generated by a carry chain which, according to the present invention, is divided into at least two segments 47 and 49. Segment 49 includes serially connected gates 51–58, one gate for each stage of the carry chain, with an inverter 59 disposed in the middle of the chain. The output of each gate in the chain becomes an input to the next gate, beginning with the least significant bit 0 and proceeding to a bit 7 of intermediate significance. A second input to each of these gates 51–58 is a current value of its associated address bit, or inverse thereof, as shown in FIG. 3. The gates 51–58 are alternating NOR and NAND gates, which allows implementation by CMOS technology but still requires essentially only one gate per carry chain stage. As indicated in FIG. 3, in order to use this particular logic, each of the NOR gates 51, 53, 56 and 58 receives the inverse of their associated current bit values, while the NAND gates 52, 54, 55 and 57 receive the current value of their associated address bits. The second carry stage 49 has an identical structure and is used with the most significant block of address bits 8–15. It includes serially connected gates 61–68 and an inverter 69 connected between gates 64 and 65.

The normal carry chain construction would cause the two segments 47 and 49 to be connected together by connecting the output of the gate 58 to an input of the gate 61 (although with an inverter inbetween in this implementation). However, in order to avoid having to await a carry value to ripple along each of the gates 51–58 before being applied to the second segment 49 of the carry chain, the present invention monitors the least significant address bits 0–7 and predicts when a carry bit will be applied to the gate 61 in a much shorter time than required for the carry bit to progress along the entire string of gates 51–58.

This is accomplished by a look ahead chain 70 having serially connected gates 71-78, with an inverter 79 in the middle of the serial chain between gates 74 and 75. Gates 71, 73, 76 and 78 are NAND gates and have an input of the current state of each of its associated least significant bits 7, 5, 2 and 0, respectively, while gates 72, 74, 75 and 77 are NOR gates having an input as the inverse of their respective current address bit values. A carry bit travels in the look ahead chain 70 from a gate 71 associated with the most significant bit 7 of the block of least significant bits 0-7, and progresses down to the least significant bit 0. A resulting carry bit output of the chain 70 is applied through a pair of inverters 81 and 83 to an input of the second carry chain stage 49, the inverters being used as buffering and to provide amplification to overcome losses when a significant length conductor is used.

Operation of the circuit of FIG. 3 when incrementing through the range of address count F5 to 104 will now be explained with respect to FIG. 2. Because this is an incrementing function, the bit patterns to be encountered and generated are known in advance. It is this knowledge with which the look ahead chain 70 operates. While the carry chain segment 47 propagates its carry bit from the least significant bit 0 through the most significant bit 7 of that address block, the look ahead chain 70 propagates its carry bit in an opposite direction. Thus, it can be seen from FIG. 2 that the for the count F5, each of the first four stages 71-74 of the look ahead chain 70 remain in a one state. As the count progresses to F8, the fifth stage, gate 75, also becomes a one. At count FC, another bit, monitored by gate 76, becomes a one, and at count FE, the seventh bit, monitored by gate 77, becomes a one. Thus, at each of these counts, there are a number of serially connected gates which do not change state in progressing from one count to another. Thus, there is no gate delay in these stages since the gates are not changing output state. Therefore, for example, when at count FE, each of the gate stages 71-77 is in a state that remains the same when incrementing to the next count FF. Only the last gate 78 changes state for this count. Thus, there is only one gate delay in the chain 70 in proceeding between those two counts.

However, the increment carry chain segment 47, since the changing value of the 0 bit of the address between counts FE and FF occurs at the beginning, each of the eight gates must change state, thus involving eight gate delays as the carry bit is propagated along the chain 47. So by looking ahead at the pattern of bits, the look ahead chain 70 can, with one gate delay, provide an input to the second carry chain segment 49 as the count progresses from FF to 100. When incrementing from count FF to 100 as indicated in FIG. 2, the value of bit 8 of the address changes for the first time from a 0 to a 1. From the count 100 on, the second segment 49 of the carry chain need not wait for a carry bit to ripple through numerous delays in the first segment 47 before it can begin its operation. The look ahead chain 70 sets its input immediately at a carry one. That carry signal can then progress down the second segment 49 at the same time the first carry signal is progressing the least significant bit carry chain 47. The result is less time required to increment from one count to another.

The same principles described with respect to FIG. 3 can be employed when decrementing in count, such as proceeding from count 104 of FIG. 2 to count F5. The make the circuit of FIG. 3 operate in a decrementing state in the same manner as described for the incrementing state, the adder 29 remains the same, while the current values of the address bits applied to each of the gates of the increment chain segments 47 and 49 and to the look ahead chains 70 are inverted. For example, the gate 53 has its input B2# changed to B2, and adjacent gate 54 would have its input B3 changed to B3#.

FIG. 4 shows a system utilizing the circuit in FIG. 3 to both increment and decrement a 16 bit address. In order to efficiently use space on an integrated circuit, and in order to make it easy to design the chains and adders of FIG. 3, repeatable cells of identical circuit structure are connected together. Cells 85-88 are provided in the system of FIG. 4 for the least significant block of address bits 0-7, while cells 89-92 are connected together and used with the most significant block of bits 8-15. Each of the cells is identical and adapted to be connected together to form the necessary chains and adders. FIG. 5 is a circuit diagram of the cell 85. Even though the adjacent gates of each of the chain segments 47, 49 and 70 are different, a cell structure has been devised that can be repeated by making each cell have the chain gates for two non-contiguous bits. That is, for example, the cell 85, as indicated in both FIGS. 4 and 5, contains the chain and adder logic elements that are associated with address bits 0 and 4. Similarly, identical cell 86, connected on one side to cell 85, is associated with address bits 1 and 5, cell 87 with bits 2 and 6, and cell 88 with bits 3 and 7.

In the same manner, for the higher order bits, the cell 89 is connected to receive the current values of bits 8 and 12 and calculate new values for those bits, cell 90 for bits 9 and 13, cell 91 for bits 9 and 10, and cell 92 for bits 11 and 15. A control signal in the line 95 to these circuits designates whether the circuit is operating to increment or decrement the address.

As a buffer and for temporary storage, a flip-flop circuit is provided for each bit of the address and interposed between that bit of the address register 23 and the cell with which it is utilized. For example, a flip-flop circuit 103 is connected between bit 0 of the address register 23 and the lines of cell 85 which are connected to the bit 0 for both reading its current value and writing a new value into that position of the register 23. Similarly, a flip-flop circuit 105 passes current values and new values of bit 4 between the cell 85 and the storage location of the address register 23 for bit 4.

Referring to FIG. 5, it will be noted that for the bits 0 and 4 to which the gates of that circuit are connected, gates 74 and 78 from the look ahead detect chain 70 of FIG. 3 are provided. Corresponding gates 107 and 109, respectively, provide the same look ahead function when the circuit is being utilized in a decrement mode. The terminating lines to the left and right of FIG. 7 are adapted for connection to corresponding lines on the opposite side of the same cell which is repeated in a location immediately adjacent it. This results in forming a complete look ahead chain for the increment or decrement case. Since the particular cell chosen for illustration in FIG. 5 also has its right hand leads connected to circuit elements other than an additional cell, output line 97 is the end of the look ahead chain 70 while output line 99 is the end of the corresponding look ahead detection chain for the decrement case. A switch 101 (FIG. 4) operates to connect one of those two lines, through inverters 81 and 83, to an input of the increment carry chain 49 that is implemented in the cells 89-92. The switch 101 operates in response to the control signal in the line 95 which originates from the system microprocessor 13.

Rather than providing duplicate carry chains for the increment and decrement case, the gates 51 and 55 of the increment carry chain 47 are used in the FIG. 5 circuit during both incrementing and decrementing the address count. Switches 111 and 113 operate between two positions in response to the control signal in the line 95. When incrementing, the gate 51 is connected to the bit line B0#. When decrementing, that gate 51 input is connected to the input bit line B0. Similarly, the gate 55 is connected to the bit line B4 during incrementing and to the bit line B4# during decrementing.

It will be noted from the discussion of FIG. 3 that there is no look ahead detecting chain for the higher order block of bits 8-15. However, the implementation of FIGS. 4 and 5 will provide the gates and interconnection for those chains even though they are not used. This is so the repeatable cell of FIG. 5 remains the same when repeated, and thus has the advantage of making the circuit design simpler, rather than having to deal with two different types of cells for the least significant bit block and the most significant bit block. It will also be noticed from FIG. 3 that gates 58 and 68 are unnecessary but, again, are more easily provided in the interest of being able to use a repeatable cell design than varying the cell design for two of the bits in order to eliminate those gates.

The result of this structure also is that there is only one gate per stage of each of the chains 47, 49 and 70, as can be easily seen from FIG. 3. The disadvantage of using a single gate available in the CMOS process, namely the need to use two different types of gates in the chain, is overcome by the uniform cell design of FIG. 5 wherein the gates of the chains for two non-contiguous bits are combined into the same cell. This minimizes the number of gates required and thus minimizes space on the integrated circuit that must be dedicated for these purposes. It further minimizes the time necessary for a carry bit to travel the length of the chain. Each of the chains 47, 49 and 70 of FIG. 3 utilizes only one gate per bit, plus an inverter in the middle of the chain that is necessary for the particular cell implementation described in FIGS. 4 and 5. Another circuit layout may not require those inverters but rather would change the type of gates utilizes in the second half of each of those chains.

The techniques of the present invention can also be employed in an embodiment where an address word is broken into more than the two blocks of the specific example described. There would then be more than two carry chain segments, one for each block of bits into which the address is divided. The number of operating look ahead chains will be one less than the number of carry chain segments. Such further division of the address word allows even more parallelism and faster operation.

Although the various aspects of the present invention have been described with respect to a preferred embodiment, it will be understood that the invention is entitled to full protection within the full scope of the appended claims.

It is claimed:

1. In an incrementer and/or decrementer of a binary word of a given number of bits which includes a carry chain having a plurality of serially connected logic element stages substantially equal to said given number of bits and addition logic elements connected in parallel thereto, the improvement wherein said carry chain is separated into at least first and second disconnected groups of serially connected stages, said first group being associated with a least significant group of bits of said binary word and said second group being associated with a mutually exclusive group of more significant bits, and including a look ahead chain having a number of serially connected logic stages substantially equal to that of said first group and having an output connected to an input of said second chain group.

2. In an electronic circuit for incrementing and/or decrementing a binary word of a given number of bits extending from a least to a most significant bit, a circuit for determining the carries used in addition and/or subtraction, comprising:

first means responsive to a current state of the word bits for calculating a carry in a series of steps beginning by using the least significant bit and up to use of a bit of intermediate significance, second means responsive to the current state of the word bits for calculating a carry in a series of steps beginning with the bit of intermediate significance and up to use of the least significant bit, thereby to generate an output carry signal, and third means responsive to the current state of the word bits and said output carry signal for calculating a carry in a series of steps beginning with use of a bit adjacent to said bit of intermediate significance and u to the most significant bit.

3. An incrementer and/or decrementer of a binary word of a given number of bits, wherein the bits are identified in terms of a significance of their position in the word, comprising:

means for temporarily storing a current value of said given number of bits, a first carry chain of a plurality of serially connected logic element stages having its individual stages connected to said storing means for receiving the current value of each of a group of least significant bits, and having an input connected to receive a carry bit and apply it to its stage associated with the least significant of said least significant bit group, a second carry chain of a plurality of serially connected logic element stages connected to said storing means for receiving the current value of each of a group of more significant bits, and having an input connected to its stage associated with the least significant of said more significant bit group, a plurality of addition logic elements having inputs connected to the individual stages of said first and second carry chains and to said storing means, and having outputs that provide new values of the given number of bits of said binary word, and a look ahead chain of a plurality of serially connected logic element stages connected to said storing means for receiving the current value of the bits in the least significant bit group and having an input connected to receive a carry bit and apply it to its stage associated with the most significant of said least significant bits and an output from its stage associated with the least significant of said least significant bits, said output being connected to the input of said second chain.

4. The combination of claim 3 wherein the logic element stages of each of the chains includes a plurality of series connected stages that alternate between NAND and NOR logic gates and only use one such gate per stage.

5. The combination of claim 4 wherein said chains are formed in a CMOS integrated circuit structure.

6. The combination of claim 5 wherein at least said first carry chain and said look ahead chain are formed with their said logic elements organized in repeatable interconnected cells, each cell including a NAND and a NOR logic gate from non-adjacent stages of each of said first carry chain and said look ahead chain.

7. A method of changing by one a current binary value of a given binary word having a given number of bits in width to a new value, comprising the steps of:

dividing the binary word into at least two groups of mutually exclusive contiguous bits, a least significant group and a more significant group, propagating a carry bit along a first carry chain having a number of serially connected stages that each receives the current value of a unique one of the least significant group, said propagation occurring from the stage associated with the least significant to the most significant bit of said least significant group, propagating a carry bit along a first look ahead chain having a number of serially connected stages that each receives the current value of a unique one of the least significant group, said propagation occurring from the stage associated with the most significant to the least significant bit of said least significant group and providing an output, propagating the output of the look ahead chain along a second carry chain having a number of serially connected stages that each receives the current value of a unique one of the more significant group, said propagation occurring from the stage associated with the least significant to the most significant bit of said least significant group, and applying the states of the stages of both first and second look ahead chains and the current bit values to a logic addition circuit, thereby to determine the new bit values.

* * * * *

UNITED STATES PATENT AND TRADEMARK OFFICE
CERTIFICATE OF CORRECTION

PATENT NO. : 5,027,310

DATED : JUNE 25, 1991

INVENTOR(S) : MONTE J. DALRYMPLE

It is certified that error appears in the above-identified patent and that said Letters Patent is hereby corrected as shown below:

Column 8, line 29, in Claim 2:   replace "u" with --up--

Column 9, line 12, in Claim 7:   delete "given" before "binary"

Signed and Sealed this

Tenth Day of November, 1992

Attest:

DOUGLAS B. COMER

Attesting Officer   Acting Commissioner of Patents and Trademarks